United States Patent [19]
Chitwood et al.

[11] 4,069,878
[45] Jan. 24, 1978

[54] RAISE DRILLING BIT WITH DETACHABLE STEM

[75] Inventors: Byron W. Chitwood; Thomas E. Winship, both of Houston, Tex.

[73] Assignee: Reed Tool Company, Houston, Tex.

[21] Appl. No.: 664,851

[22] Filed: Mar. 8, 1976

[51] Int. Cl.² ............................................. E21C 23/00
[52] U.S. Cl. ...................................... 175/53; 175/320; 403/15
[58] Field of Search ................. 175/53, 389, 325, 320; 403/15, 37

[56] References Cited

U.S. PATENT DOCUMENTS

| | | | |
|---|---|---|---|
| 456,770 | 7/1891 | Muirhead | 175/53 X |
| 2,079,449 | 5/1937 | Haldeman | 175/325 X |
| 2,759,705 | 8/1956 | Bjorkman | 175/389 |
| 3,061,342 | 10/1962 | Feller | 403/15 |
| 3,494,642 | 2/1970 | Coberly et al. | 403/15 X |
| 3,508,773 | 4/1970 | Coberly et al. | 403/37 |
| 3,747,700 | 7/1973 | Rilling | 175/325 X |
| 3,917,009 | 11/1975 | Dyer et al. | 175/53 |
| 3,937,103 | 2/1976 | Kleinhaus | 403/15 X |
| 3,938,853 | 2/1976 | Jurgens et al. | 308/4 A |
| 3,945,446 | 3/1976 | Ostertag et al. | 175/325 X |
| 4,011,019 | 3/1977 | McDonald et al. | 175/53 X |
| 4,011,918 | 3/1977 | Jurgens | 175/325 |

Primary Examiner—Ernest R. Purser
Assistant Examiner—Richard E. Favreau
Attorney, Agent, or Firm—Neal J. Mosely

[57] ABSTRACT

A rotary drill bit for producing a raise bore about a pilot hole comprises a drill head having an upper surface for mounting cutter assemblies and lower surface spaced from said upper surface. The upper and lower surfaces are secured to and connected by a body sub. A drive stem is removably secured in the drive sub. The drive sub and stem have mating tapered portions for a press fit. Either the sub or the stem is provided with a spiral groove through which oil is injected under high pressure to expand the sub while the stem is rammed into place under high pressure. The stem can be removed by application of oil pressure and a ram force in the opposite direction.

3 Claims, 2 Drawing Figures

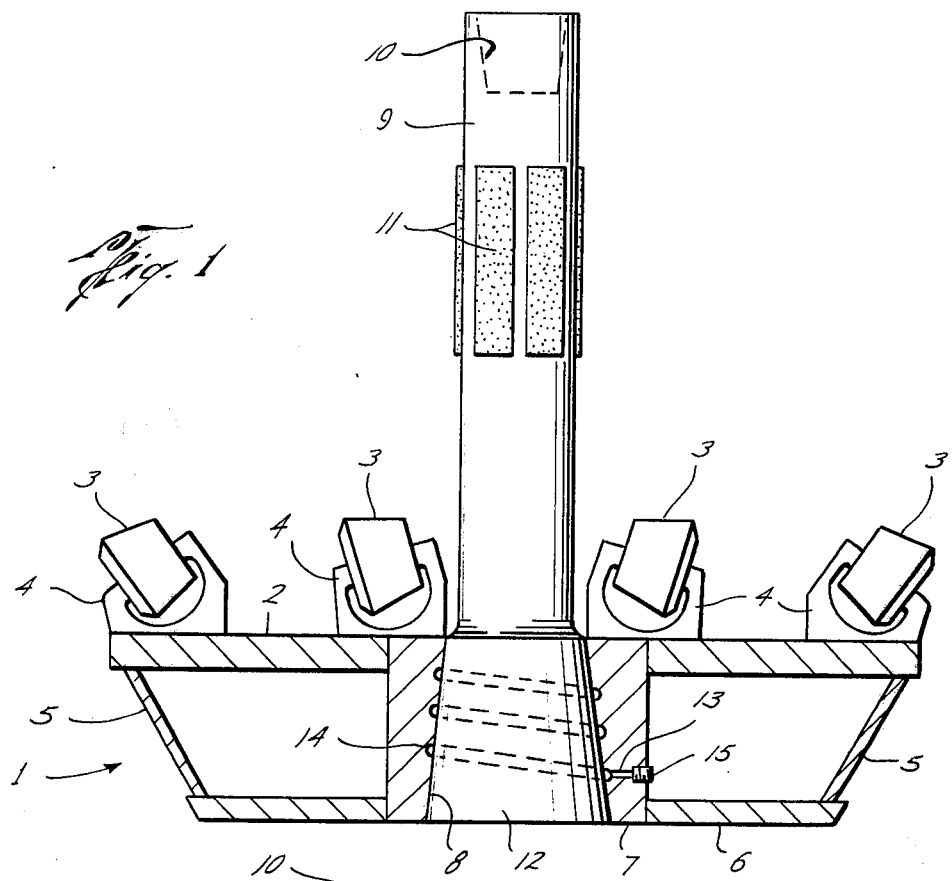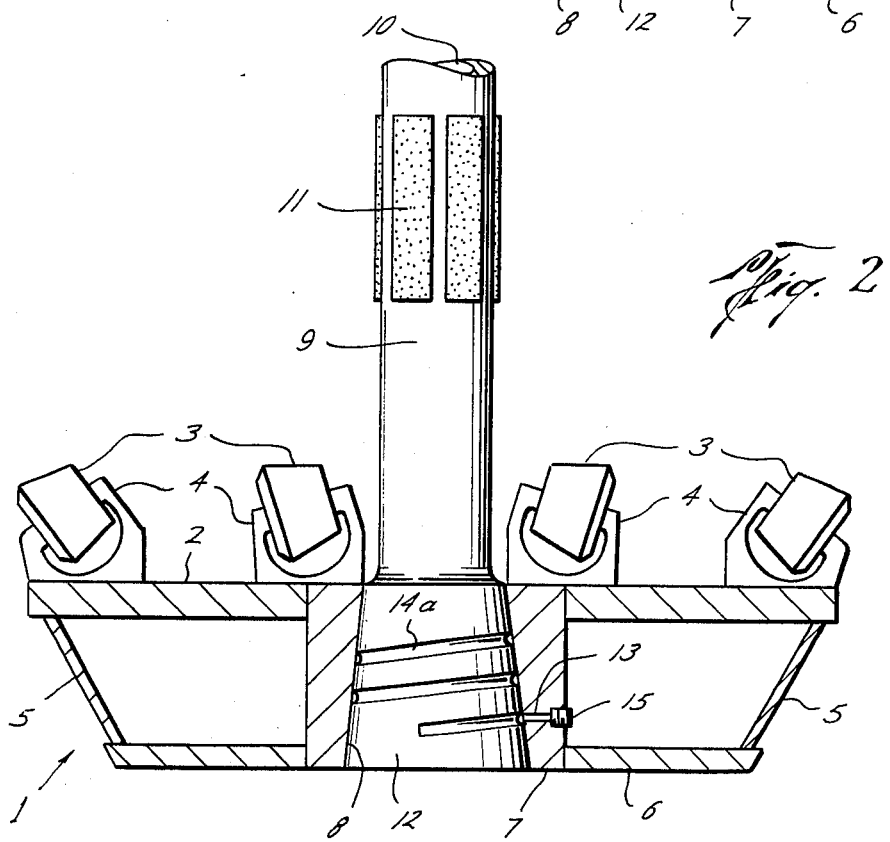

RAISE DRILLING BIT WITH DETACHABLE STEM

BACKGROUND OF THE INVENTION

1. Field of the Invention

This invention relates to new and useful improvements in raise bore drill bits and more particularly to raise bore bits having a removable drive stem.

2. Description of the Prior Art

The use of raise bore drill bits for drilling vertical or angled shafts in mining is well-known in the art. Raise drilling comprises the drilling of a relatively small diameter pilot hole followed by enlargement of the hole to a predetermined raise diameter by rotating a raising a large diameter drill bit along the pilot hole to form a raise bore between a lower level and an upper level. The drill bit is rotated from above by a drill stem and guided by the pilot hole. During the drilling operation the cuttings produced fall through the drill to the lower level.

In raise bore drilling, raise bores are usually 48 inches in diameter or more and they range to sizes as large as 10 or 15 feet in diameter. The pilot hole will typically have a diameter of 9 to 15 inches. A raise drill bit is quite massive in size and may weigh 5,000 pounds or more. The raise drilling operation is commenced by rotation of the drill string by a drilling rig causing the raise drill bit to rotate at approximately 10 – 40 R.P.M. while the rig exerts an upward pull on the bit ranging from about 150,000 – 950,000 pounds. As the drilling progresses, sections of the drill stem which are usually cylindrical or tubular members approximately 5 feet in length are progressively uncoupled at the upper level and the raise is completed by rotating and lifting the drill stem and the raise drill bit.

It will be appreciated that such raise drill bits, drill stems and the drive connections to the drill bits are subjected to severe wear and stresses which ultimately result in failure, usually in fatigue. Certain of the prior art is concerned with the replacement of components, such as cutters and the like. Another problem in raise bore drilling involves the changing of the drill stem in the field after it has been broken or bent by dropping or cross-threaded connection or by fatigue failure. Also, limited space conditions in underground mines sometimes require a raise boring bit body to be at least partially disassembled so that it can be transported in small drifts, small cages, or through other small openings.

SUMMARY OF THE INVENTION

This invention comprises a new and improved raise bore drill bit wherein the drill stem may be readily replaced. In particular, this invention is concerned with a raise bore drill bit having a replaceable drill stem having a taper at its lower end which flares outward and which engages a tapered opening in a supporting sub on the drill bit. The sub is expanded by oil pressure during assembly and the stem is pressed into position with the result that it is held very tightly by relaxation of the expanding pressure on the sub.

BRIEF DESCRIPTION OF THE DRAWINGS

FIG. 1 is a view of one embodiment of the invention taken in vertical section and illustrating the application of pressure through a passage in the drill sub.

FIG. 2 is a view of another embodiment of the invention taken in vertical section and showing a passage through the drill stem for applying pressure to expand the drill sub.

DESCRIPTION OF THE PREFERRED EMBODIMENTS

Referring to the drawings by numerals of reference, and more particularly to FIG. 1, there is shown a raise bore drill 1 comprising a main cutter plate 2 on which there are secured a plurality of cutter assemblies 3 supported by yokes 4 thereon. The yokes 4 may be welded to the cutter plate 2 or may be removably secured thereon by any of a variety of means well known in the art. The cutter plate 2 is welded to supporting members 5 which are in turn welded to a lower supporting plate 6. A cylindrical sub 7 is welded to plates 2 and 6 and has a tapered inner passage 8 which tapers outward from top to bottom.

The raise bore drill bit has a drive stem 9 which has a tapered threaded opening 10 at its upper end to provide a threaded connection to drill pipe. The drill bit stem 9 is cylindrical in shape and provided with hard metal wear pads 11 along the main body thereof. At its lower end, the drill bit stem 9 has a conical portion 12 which flares outwardly and is of a size to match the tapered opening 8 in the sub 7. Actually, the tapered portion 12 is very slightly larger than the opening 8 and will be assembled as subsequently described. The sub 7 has an opening 14 which opens into a helical groove 14 on its inner surface and which is closed by a threaded plug member 15 after the apparatus has been assembled. The apparatus shown in FIG. 2 is identical to that in FIG. 1 except that the helical passage 14a (corresponding to passage 14 in FIG. 1) is cut in the tapered portion 12 of the drill bit stem 9 rather than on the inside surface 8 of the sub 7. In this embodiment, the passage 13 opens into passage 14a and is closed by threaded plug member 15 as in FIG. 1.

The assembly of the apparatus shown in FIGS. 1 and 2 is essentially identical. The drill stem 9 and wear pads 11 are of a size that will fit through the upper, smaller end of tapered passage 8. The drill stem is inserted through passage 8 until the tapered lower end portion 12 engages the walls of the tapered passage. The tapered portion 12 has the same taper as tapered passage 8 but is very slightly larger. Plug member 15 is removed and passage 13 is connected to a high pressure oil source. Oil under high pressure is circulated through the helical passages 14 (or 14a in FIG. 2) and is of sufficient pressure to expand the sub 7 elastically. The sub 7 is expanded under the oil pressure within the elastic limit of the steel alloy used in making the sub. While the oil pressure is applied through passage 13 to expand sub 7 a suitable hydraulic jack is applied against the lower end of the flared portion 12 of drill stem 9 to force the same into the expanded sub until the lower end is flush with the lower surface of sub 7. At this point, the oil pressure introduced through passage 13 is released to allow the sub 7 to shrink from its expanded state. Passage 13 is then closed by threaded plug 15. The shrinking of sub 7 after release of the oil pressure results in an interference fit between the inner tapered surface of sub 7 and the lower tapered end portion 12 of drill bit stem 9. The mating pressure is of the order of several thousand pounds per square inch with the result that the sub 7 will not slip relative to the tapered portion 12 during the high torque and high thrust encountered by the apparatus during raise bore drilling.

The apparatus may be disassembled by essentially reversing the assembly procedure. The passage 14 or 14a is flooded with oil under high pressure to expand sub 7 and a hydraulic jack or other suitable pressure applying means is applied to the upper end of drill stem 9 to force the stem out of the tapered joint.

The design of the particular dimensions of the tapered joint is easily accomplished applying standard engineering calculations. In a typical raise bore drill bit in which the distance between the upper end and lower end of sub 7 is 16 inches the tapered opening 8 is 12 inches wide at its lower end and 11.5 inches wide at its upper end. The tapered portion 12 of drill stem 9 is 12 inches wide at its lower end and has a taper of 1:30 inward for the 16 inch length of interference fit contact. The sub is expanded 0.030 inches during assembly and the difference in size between the flared portion 12 and tapered opening 8 requires that the tapered portion 12 be driven up by a distance of 0.924 inches. The mating pressure between the inner surface of the tapered opening 8 and the tapered portion 12 is about 18,500 p.s.i. Obviously, the ratios of taper and relative size of the opening in the sub would be designed for other larger or smaller connections according to the amount of force required for a suitable pressure mating of the sub and the tapered end portion of the drill bit stem.

We claim:

1. A rotary raise drill bit for producing a raise bore by disintegrating the earth formation surrounding a pilot hole comprising:

a drill head having an upper mounting member, a plurality of cutters secured to said upper mounting member, a drill stem, a supporting sub secured to said upper mounting member and having a vertical passage tapered outward toward its lower end portion for receiving said drill stem, said drill stem having an upper portion smaller in size than the passage in said sub and operable to pass therethrough during assembly and a lower portion larger in size than said passage prior to assembly and tapered to fit said passage when expanded, the outer tapered surface of the lower portion of said drill stem and the lower tapered surface of said passage being of a shape to mate with a longitudinally sliding fit during assembly, and means extending through the wall of said sub to apply force into said passage to expand the same during longitudinal sliding assembly to provide a compression fit of said passage on said lower portion of said drill stem after relaxation of said force, and the difference in size and the taper of said passage in said sub and said drill stem lower portion being such that said compression fit is in excess of the maximum torque encountered in drilling.

2. A rotary drill bit according to claim 1 in which there is provided a helical passage in at least one of the mating surfaces of said sub and the tapered portion of said drill stem open to said passage in the wall of said sub for introduction of oil to expand said sub.

3. A method of assembling a raise bore bit as defined in claim 1 in which oil pressure is applied through the passage through said sub into the helical passage to expand the tapered passage in said sub to a size equal to that of the tapered lower portion of said drill stem, pressing the tapered lower portion of said stem into the expanded tapered passage, and releasing the pressure to allow said tapered passage to contract.

* * * * *